United States Patent [19]

Werner et al.

[11] 4,071,345

[45] Jan. 31, 1978

[54] APPARATUS FOR PRESS BENDING WINDOW GLASS

[75] Inventors: Alfons Werner; Mario Roth; Hans-Peter Siemonsen, all of Aachen; Johann Winandi, Herzogenrath, all of Germany

[73] Assignee: Saint-Gobain Industries, Neuilly-sur-Seine, France

[21] Appl. No.: 739,038

[22] Filed: Nov. 5, 1976

[30] Foreign Application Priority Data

Nov. 13, 1975 France .................. 75 34574

[51] Int. Cl.² ............................................. C03B 23/02
[52] U.S. Cl. ........................................ 65/273; 65/275; 65/287
[58] Field of Search ................ 65/104, 106, 273, 275, 65/287

[56] References Cited

U.S. PATENT DOCUMENTS

| 3,110,929 | 11/1963 | Perret | 13/5 |
| 3,123,459 | 3/1964 | Hens | 65/106 |
| 3,333,935 | 8/1967 | Valchar et al. | 65/106 |
| 3,573,889 | 4/1971 | McMaster et al. | 65/104 X |
| 3,837,833 | 9/1974 | Couture et al. | 65/288 |
| 3,871,857 | 3/1975 | Claassen | 65/273 |
| 3,960,535 | 6/1976 | Hamilton et al. | 65/104 |

FOREIGN PATENT DOCUMENTS

| 845,786 | 5/1939 | France. |
| 943,974 | 10/1948 | France. |
| 1,285,110 | 1/1965 | Germany. |
| 1,796,123 | 9/1968 | Germany. |
| 59,084 | 11/1969 | Luxembourg. |

Primary Examiner—Arthur D. Kellogg
Attorney, Agent, or Firm—Pennie & Edmonds

[57] ABSTRACT

Apparatus for bending sheets of glass by means of a bending press comprising a convex bending mold provided with a bending surface and an opposed concave bending molding, the surfaces of the bending molds in contact with the window being heated to a temperature approximating the bending temperature of the sheet of glass, wherein the concave bending mold consists of a frame which is only in contact with the sheet of glass at its periphery and wherein heaters are mounted within the frame for heating the bending surface of the convex bending surface of the opposed convex mold.

13 Claims, 3 Drawing Figures

APPARATUS FOR PRESS BENDING WINDOW GLASS

BACKGROUND OF THE INVENTION

In the operation of bending windows by means of a press, it can, for various reasons, be important to heat the surfaces of the bending tools which come into contact with the glass. In this way it is possible to prevent the temperature of the glass from being lowered by contact with the bending tools. This is especially important when the windows are to be thermally tempered after the bending operation. Moreover, as in the case with windows which will not be tempered after the bending operation, the surface cooling of the glass produced by contact with the parts of the press can produce deformations in the curved window. Accordingly, it is also desirable to heat the bending molds to avoid this disadvantage.

Presently, there are various processes and devices for heating the bending tools to a temperature approximating the bending temperature of the glass. For example, bending molds have been constructed as solid molds with continuous bending surfaces and the heating devices have been disposed inside these molds (German A.S. 1,796,123). Devices of this type inevitably lead to deformation of the bending surfaces of the molds which is very difficult to control and correct.

In another process, the bending molds again consist of solid molds and the sheets of glass disposed between the bending tools are heated by means of gas burners (German A.S. 1,285,110, U.S. Pat. No. 3,333,935). In this instance, the gas burners not only heat the bending tools but also the sheets of glass. As a result, this process does not avoid the disadvantages arising from the contact of a hot sheet of glass with the substantially cooler bending tools. Moreover, the burners are not disposed in such a way to uniformly heat the entire surface of the sheet of glass and the bending tools.

There is also a process for bending sheets of glass in which flexible metal plates are placed between the hot sheets of glass and the faces of the bending tools. These metal plates are connected to a high frequency alternating current and the sheet of glass is heated by dielectric pulses (French Pat. No. 943,974). Apart from the expenditure required for high frequency generation and the necessary safety measures in this process, the sheet of hot glass is again placed in contact with cooler surfaces of the bending molds.

SUMMARY OF THE PRESENT INVENTION

In accordance with the teachings of the present invention, the bending apparatus is constructed with heating means which avoids the surface deformation problem of the prior art and in which heating of the bending surface coming into contact with the sheet of glass is achieved as rapidly and efficiently. More particularly, the concave bending mold consists of a frame which only comes into contact with the sheet of glass at its periphery. Heaters which rapidly and uniformly heat the surface of the convex bending mold disposed opposite them are mounted inside this frame.

The heaters include infrared tubes disposed inside and behind the bending frame of the concave mold and they very efficiently heat the entire outside surface of the convex bending mold, i.e., the surface part of the mold coming into contact with the glass.

DETAILED DESCRIPTION OF THE PREFERRED EMBODIMENT

Figure 1:
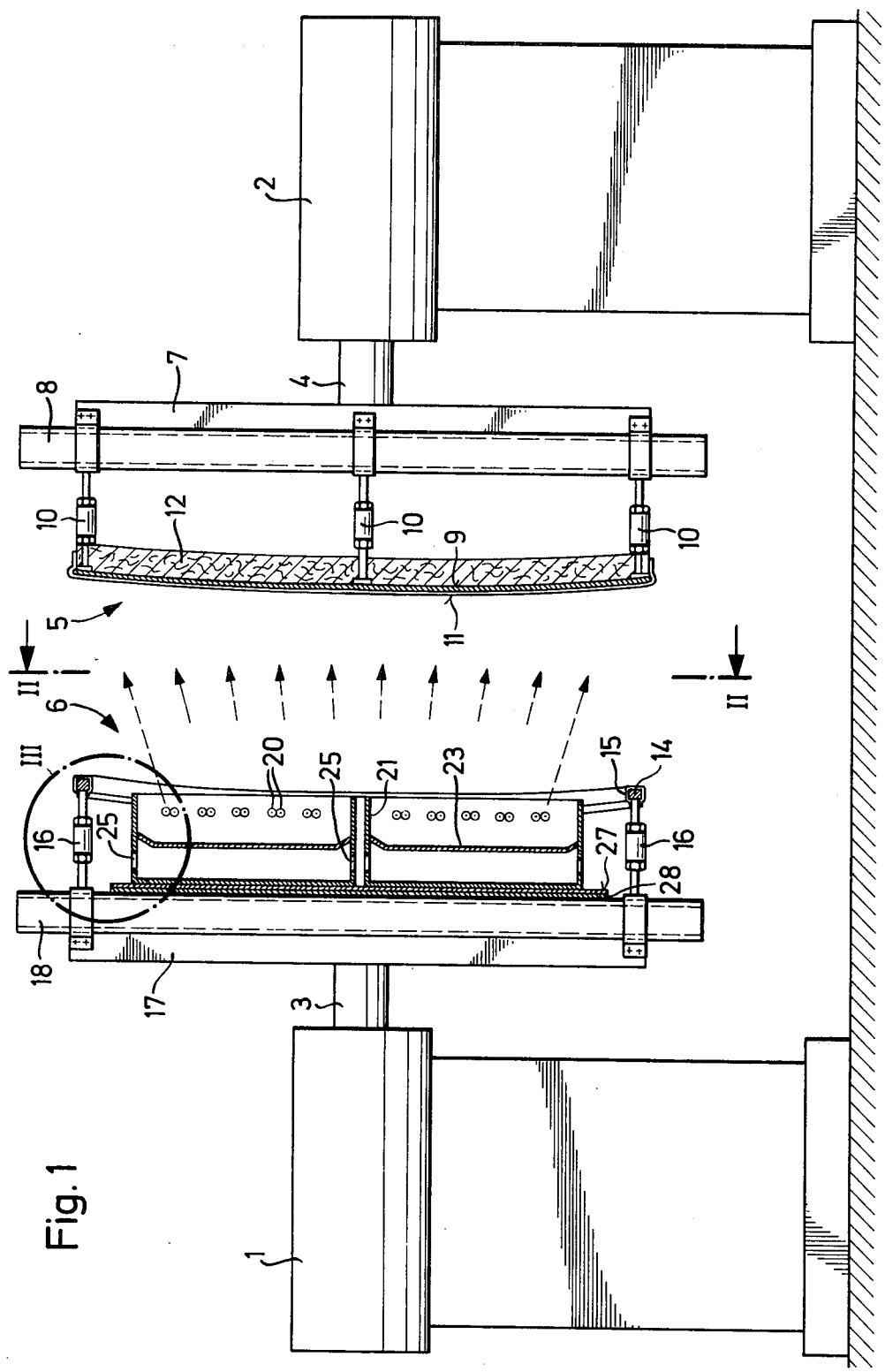
FIG. 1 is a vertical section of the bending apparatus having the features of the invention.

The bending apparatus comprises two pneumatic or hydraulic jacks 1, 2 on the rods 3, 4 of which are mounted the bending molds 5, 6. The convex bending mold consists of a support plate 7 on which are disposed tubes 8 and a metal plate 9 corresponding to the desired shape of the sheet of glass. The metal plate 9 is attached to the tubes 8 along its periphery by means of threaded securing rods 10. The shape of the metal plate 9 can be adjusted by means of the threaded rods 10. The convex surface of the metal plate 9 is covered with a fiberglass material 11. A layer of thermal insulating material in the form of a fiberglass pad 12 is disposed at the rear of the metal plate 9. The metal plate 9 consists of an aluminum sheet having a thickness of about 7 mm. The use of a thin metal frame which is well insulated at its rear face provides a bending mold having a low heat capacity, which is capable of being heated rapidly and which is subject to minimal heat losses to its rear part owing to its good thermal insulation.

Figure 2:
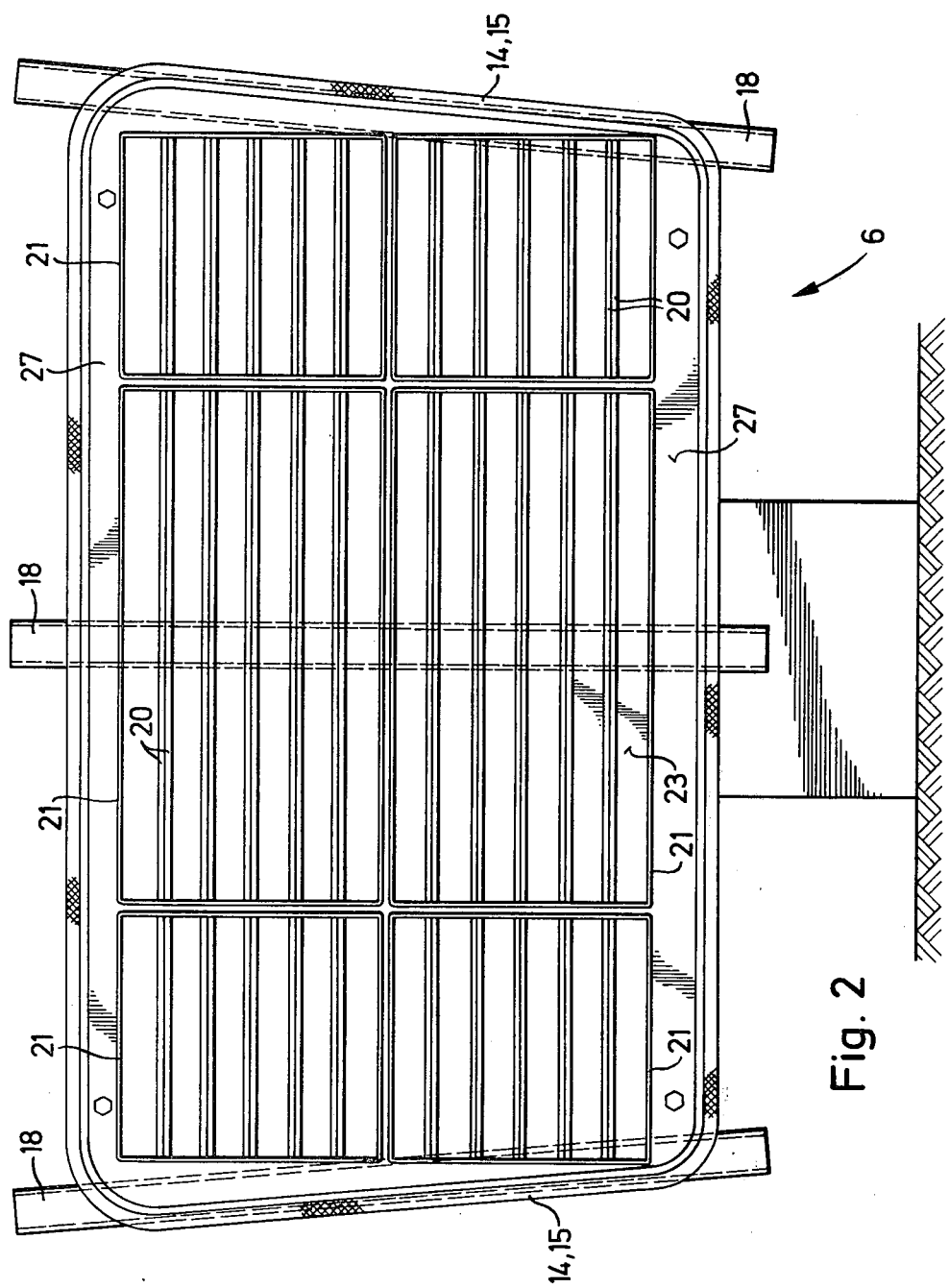
FIG. 2 shows the concave bending mold with the infrared tubes.
Figure 3:
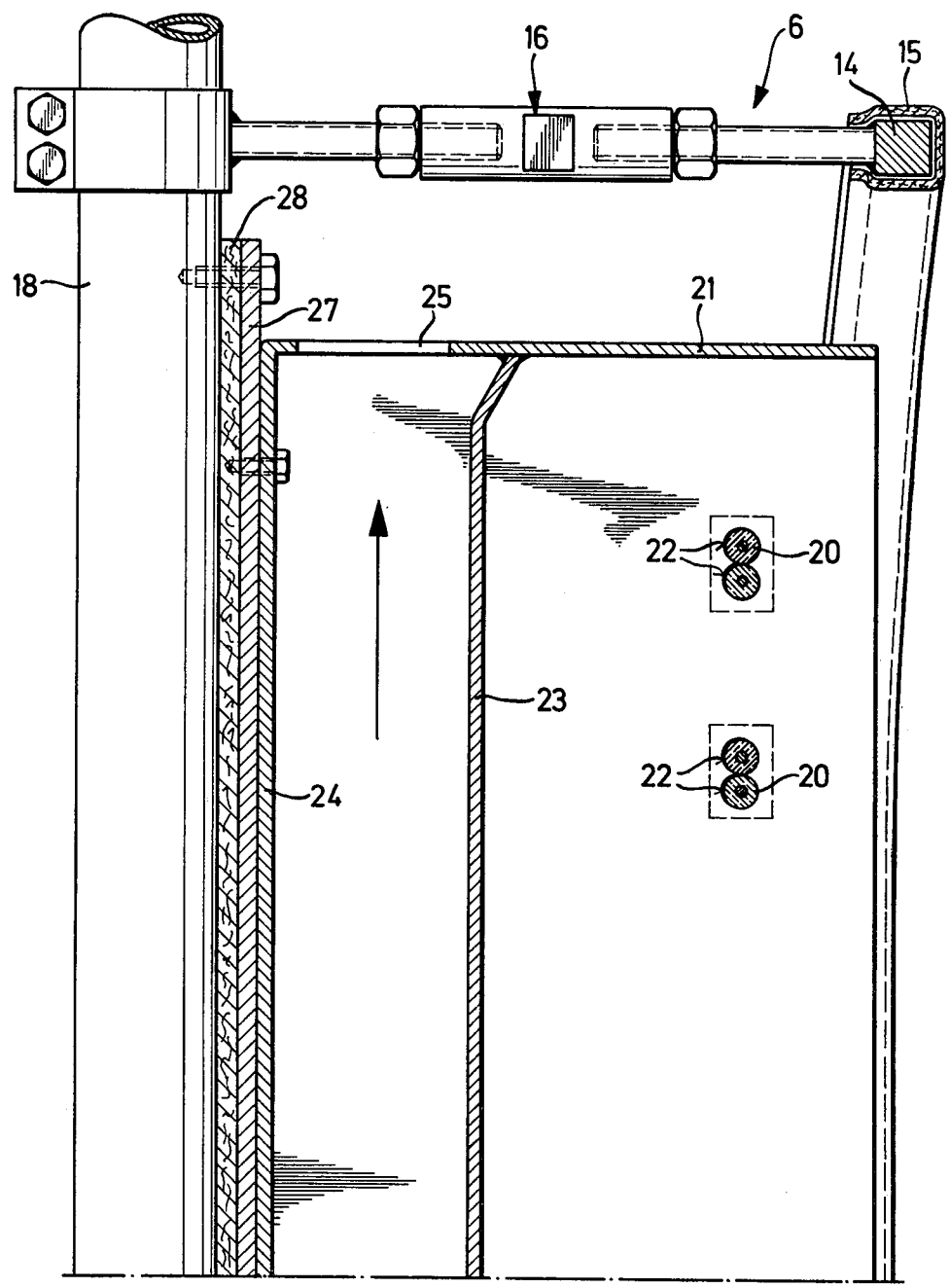
FIG. 3 is an enlarged detailed view of FIG. 1 showing the structure of the concave bending mold.

The concave bending mold, the constructional features of which are shown in FIGS. 1-3, consists essentially of a steel frame 14. As shown in FIG. 2, this frame has a shape corresponding to the periphery of the sheets of glass to be bent so that it will only come in contact with the glass at its periphery. The frame 14 is covered with a fiberglass material 15 and is also adjustable by means of the threaded rods 16 which are attached at their other ends to tubes 18 in turn mounted on the support plate 17.

The frame structure 14 of the concave mold provides an open center portion free of any structure that will contact the sheets of glass. In this center space, there is disposed a row of infrared emitters 20 emitting a medium ray length and heating the surface 11 of the bending mold disposed opposite them to a temperature of 450°-550° C.

The infrared emitters 20 are mounted in a sheet metal box 21 and consist of two twin tubes comprising a heating winding. The infrared emitters 20 are disposed to conform to the shape of the convex bending mold so as to preserve a uniform short gap between the emitting surface of the infrared tubes and the convex bending surface 11.

The maximum emission of the infrared tubes is between 2 and 4 $\mu$m. The rear face of the tubes is covered with a reflecting gold layer 22. Behind the infrared tubes the sheet metal box 21 comprises a reflecting part 23 forming with the base wall 24 of the box a cooling flue whose action is reinforced by two openings 25 disposed at the lower and upper parts of the flue. The hot air escapes through the upper opening and is replaced by cool air entering through the lower opening. To mount the box on the tubes 18, a mounting plate 27 is attached to the tubes 18 and the boxes containing the infrared tubes are screwed to the mounting plate 27. A layer of thermal insulating material 28 is disposed between the mounting plate 27 and the tubes 18.

In operation, the infrared tubes 18 effect heating of the bending surface of the convex mold prior to the placement of the sheet of glass between the molds. By heating the molding surface exclusively by means of infrared rays, it is possible to obtain maximum uniformity of heating such that temperature gradients which could cause surface deformation of the bending molds are not produced.

After the bending surface of the convex mold has been heated to a temperature approximating the bending temperature of the glass, a sheet of glass is placed between the molds. Immediately, it is fully exposed to the heat rays from the tubes 20; and these rays compensate for the heat loss produced during the passage of the sheet from the heating furnace to the bending press and also during its short period of dwell within the press. This is especially important in the case of very thin pieces of glass which pose problems in regard to bending and tempering.

The actual bending of the sheet of glass is effected by actuating the jacks 1, 2. This causes the molds to move toward each other. With this movement, the frame engages the periphery of the glass on one side while the convex surface 11 of the opposed mold contacts the opposite side of the glass to produce bending to the desired shape.

We claim:

1. In a glass bending apparatus for bending sheets of glass, said apparatus including a convex bending mold having a convex bending surface shaped corresponding to the desired shape of the glass for contact therewith over generally the entire surface of one side thereof, a concave bending mold disposed in opposed relation to the convex mold for pressing a sheet of glass against the convex surface, the heating means for heating said convex mold to approximately the bending temperature of the sheet of glass prior to placement of the sheet between said molds, the improvement wherein:
   a. said concave mold comprises a frame for contacting only the peripheral surface of the sheet of glass to be bent during pressing of the glass against the convex surface of the opposed convex mold, the center portion of said concave mold being an open space free of structure contacting the sheet of glass; and
   b. said heating means is disposed within the open space of the concave mold for heating the convex surface of the opposed convex mold to approximately said bending temperature.

2. In 2 glass bending apparatus according to claim 1, the improvement wherein:
   a. the heating means comprises infrared heaters for heating the bending surfaces of the molds by radiation.

3. In a glass bending apparatus according to claim 2, the improvement wherein:
   a. the infrared heaters are mounted in the center space defined by the frame and generally on the side of the frame opposite the opposed convex mold.

4. In a glass bending apparatus according to claim 3, the improvement wherein:
   a. the convex bending surface is defined by a thin, flexible, metal plate having a fiberglass convering thereon; and
   b. said convex mold includes adjustable supports for supporting said plate for adjustment of the profile of its convex bending surface.

5. In a glass bending apparatus for bending sheets of glass, said apparatus including a convex bending mold having a convex bending surface shaped corresponding to the desired shape of the glass, a concave bending mold disposed in opposed relation to the convex mold for pressing a sheet of glass against the convex surface, and means for heating said mold to approximately the bending temperature of the sheet of glass, the improvement wherein:
   a. said concave mold comprises a frame for contacting only the peripheral surface of the sheet of glass to be bent during pressing of the glass against the convex surface of the opposed convex mold, the center portion of said concave mold being an open space free of structure contacting the sheet of glass;
   b. said heating means comprises infrared heaters disposed within the open space of the convex mold for heating, by radiation, the convex surface of the opposed convex mold to approximately said bending temperature; and
   c. said concave mold includes an open sided box for containing said infrared heaters therein with the open side facing the opposed convex mold, said box including:
      1. a back reflecting wall disposed behind the infrared heaters for reflecting heat emitted thereby toward the opposed convex mold, and
      2. a cooling chamber behind said wall having an inlet for ambient air therein which becomes heated by said infrared heaters.

6. In a glass bending apparatus according to claim 1, the improvement wherein:
   a. said heating means comprises the sole means for heating the convex mold as well as the concave mold and the glass sheet when disposed between the molds.

7. In a glass bending apparatus according to claim 1, wherein:
   a. said heating means is disposed in direct opposed alignment with the convex surface of the convex mold for heating said surface uniformly to approximately said bending temperature.

8. In a glass bending apparatus according to claim 7, wherein:
   a. the heating means comprises infrared heaters for heating the bending surface of the convex mold by radiation; and
   b. said heating means generally fills the entire open space of the concave mold.

9. In a glass bending apparatus according to claim 8, wherein:
   a. said infrared heaters consist of a plurality of tubes extending across said open space and having their rear face covered with a reflective layer of gold.

10. In a glass bending apparatus according to claim 8, wherein:
    a. said heating means extends across the open space to present a convex shape which is generally the same as the shape of the convex surface of the convex mold and uniformly spaced therefrom and from the glass sheet when disposed between the molds.

11. In a glass bending apparatus according to claim 1, wherein:
    a. the heating means comprises infrared heaters for heating the bending surface of the convex mold by radiation; and
    b. the convex mold includes:
       1. a metal plate of low heat capacity, and 2. a layer of thermal insulating material attached to the rear of said plate.

12. In a glass bending apparatus according to claim 11, wherein:
 a. said metal plate is of flexible construction; and
 b. said convex mold includes adjustable supports for supporting said plate for adjustment of the profile of its convex bending surface.

13. In a glass bending apparatus according to claim 12, wherein:
 a. said convex mold further includes a fiberglass convering on said plate for direct contact with said glass sheet.

* * * * *